United States Patent [19]

Furuhashi

[11] Patent Number: 4,853,836
[45] Date of Patent: Aug. 1, 1989

[54] SNUBBER ENERGY REGENERATING CIRCUIT

[75] Inventor: Takeshi Furuhashi, Nagoya, Japan

[73] Assignee: Kabushiki Kaisha Toshiba, Kawasaki, Japan

[21] Appl. No.: 175,291

[22] Filed: Mar. 30, 1988

[30] Foreign Application Priority Data

Mar. 31, 1987 [JP] Japan ................................. 62-78601

[51] Int. Cl.$^4$ ........................................... H02H 7/122
[52] U.S. Cl. ....................................... 363/58; 363/137
[58] Field of Search ....................... 363/55, 56, 57, 58, 363/96, 132, 135-138

[56] References Cited

U.S. PATENT DOCUMENTS 3,460,021  8/1969  Schlabach ........................... 363/138
4,566,051  1/1986  Komulainen .......................... 363/56
4,691,270  9/1987  Pruitt ................................... 363/56

FOREIGN PATENT DOCUMENTS

56-136173  10/1981  Japan .

Primary Examiner—Peter S. Wong
Attorney, Agent, or Firm—Oblon, Spivak, McClelland, Maier & Neustadt

[57] ABSTRACT

In a snubber circuit, two transformers for regenerating snubber energy are commonly provided for more than two switching elements in each of the arms of an inverter. The number of snubber energy regenerating transformers can be limited to only two, regardless of the number of switching elements. The circuit can be simple and compact, without decreasing the efficiency of regeneration of snubber energy.

14 Claims, 8 Drawing Sheets

SNUBBER ENERGY REGENERATING CIRCUIT

BACKGROUND OF THE INVENTION

1. Field of the Invention

The present invention relates to a snubber energy regenerating circuit for regenerating an energy of a snubber circuit in order to prevent an overvoltage or too large dv/dt of a voltage applied to a semiconductor element in a power converter.

2. Description of the Related Art

A power converter using semiconductor elements is provided with a snubber circuit so as to prevent the semiconductor elements from being broken due to an overvoltage or a voltage which rises fast (large dv/dt). Capacitance Cs of a capacitor in the snubber circuit is required to be increased since recent semiconductor elements have a high widthstand voltage and a large current. For example, in a 4,500 V, 2,500 A gate turn-off thyristor (to be referred to as a GTO hereinafter), a capacitor of Cs=6 μF is used. When the thyristor is used at power supply voltage V=2,000 V, the power supply voltage is charged/discharged on/from a snubber capacitor upon switching of the GTO. In this case, when switching frequency f of the GTO is 50 Hz, power Pcs upon charging/discharging is as high as:

$$Pcs = (\tfrac{1}{2})Cs \cdot V^2 \cdot f \qquad (1)$$
$$= \tfrac{1}{2} \times 6 \times 10^{-6} \times 2000^2 \times 50$$
$$= 600 \, (W)$$

If this power is consumed by, e.g., a snubber resistor as a loss, this causes a decrease in efficiency of the apparatus. Then, the outer shape of the snubber resistor becomes considerably large, and a large amount of heat is generated by the resistor. Therefore, the apparatus cannot be made compact.

Figure 2:
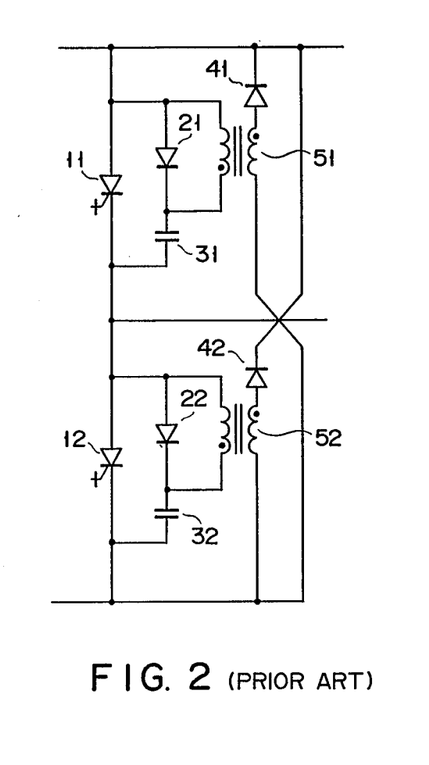
FIG. 2 is a circuit diagram showing a conventional snubber energy regenerating circuit.

FIG. 2 shows a conventional snubber energy regenerating circuit. Since upper and lower arms are equivalent to each other, the upper arm will be described below. A series circuit of snubber capacitor 31 and snubber diode 21 is connected in parallel with switching element 11, and voltage transformer 51 is connected in parallel with diode 21. The secondary winding of voltage transformer 51 is connected to a DC power supply bus through diode 41. The operation of this circuit will be explained with reference to FIG. 3.

Figure 3:
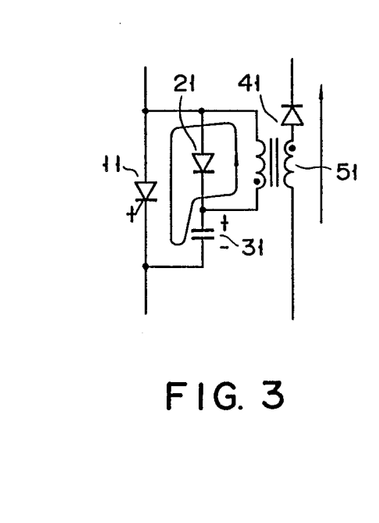
FIG. 3 is a partial circuit diagram for explaining the circuit operation of FIG. 2.

Assume that switching element 11 is kept off. In this case, a power supply voltage is charged on snubber capacitor 31. When switching element 11 is turned on, a charge on snubber capacitor 31 is discharged through voltage transformer 51 and semiconductor element 11. The turn ratio of the windings of voltage transformer 51 is set so that a voltage higher than the DC power supply voltage is induced in the secondary winding of voltage transformer 51. Thus, diode 41 is enabled by discharging, and energy on snubber capacitor 31 is regenerated to a DC power supply.

Figure 4:
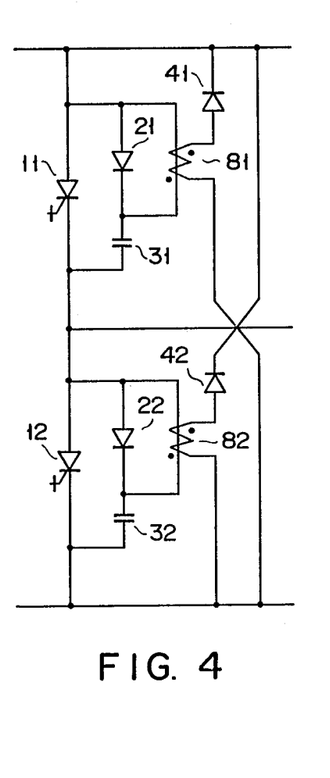
FIG. 4 is a circuit diagram showing a snubber energy regenerating circuit, which could be considered as a modification of FIG. 2.

FIG. 4 shows a circuit which could be considered as a modification of FIG. 2. In place of voltage transformers 51 and 52 in FIG. 2, current transformers 81 and 82 are used. The operation of this circuit is basically the same as that of FIG. 2.

The snubber energy regenerating circuit described above theoretically includes no element which consumes large energy, and is a good system. However, this circuit requires a relatively expensive transformer for each switching element. In addition, when a circuit such as a three-phase bridge inverter using a large number of switching elements is considered, the circuit arrangement is complicated.

SUMMARY OF THE INVENTION

It is an object of the present invention to provide a snubber energy regenerating circuit which can minimize an energy loss, and can simplify a circuit arrangement.

In order to achieve the above object, according to the present invention, one or two transformers for regenerating snubber energy are commonly provided to two or more switching elements in all the arms of an inverter.

In a snubber circuit with the above arrangement, the number of snubber energy regenerating transformers can be limited to only one or two, regardless of the number of switching elements. Thus, the circuit can be simple and compact, and can have low cost as compared to a conventional circuit, without decreasing regenerating efficiency of snubber energy.

DETAILED DESCRIPTION OF THE PREFERRED EMBODIMENTS

An embodiment of the present invention will be described hereinafter with reference to the accompanying drawings. Note that circuit elements having the same functions are denoted by the same reference numerals throughout the drawings.

Figure 1:
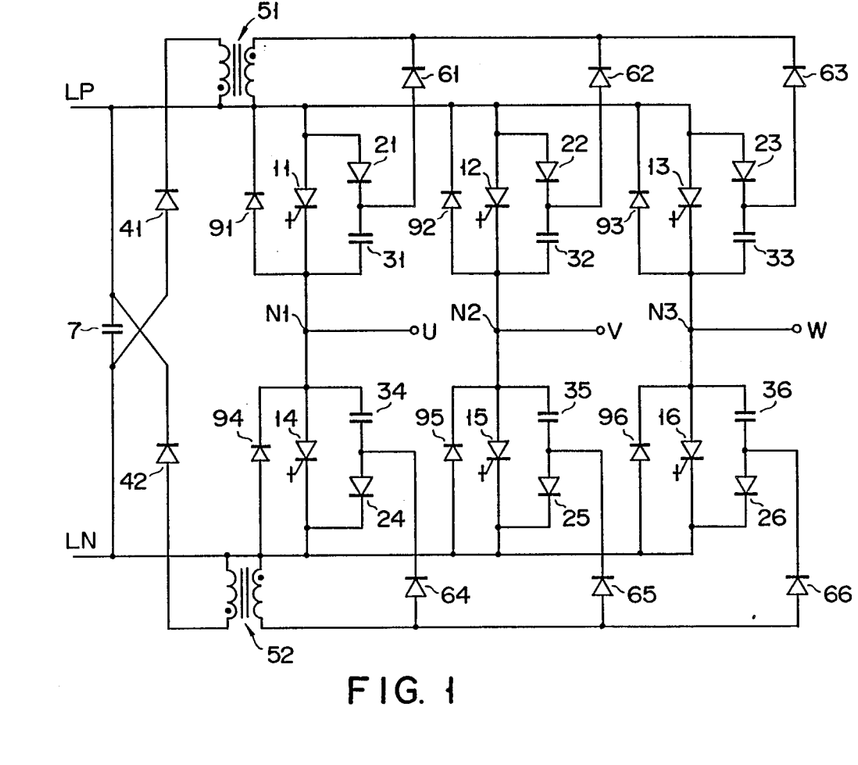
FIG. 1 is a circuit diagram showing a three-phase inverter including a snubber energy regenerating circuit according to an embodiment of the present invention.

FIG. 1 shows a three-phase power converter (inverter) including a snubber energy regenerating circuit according to an embodiment of the present invention.

Referring to FIG. 1, DC input capacitor 7 is connected between positive and negative DC power supply buses LP and LN. Positive DC power supply bus LP is connected to the secondary winding start end (indicated by a black dot) of voltage transformer 51. The secondary winding termination end is connected to negative bus LN through the cathode and anode of diode 41. The primary winding start end (indicated by a black dot) of transformer 51 is connected to the cathode of each of diodes 61 to 63, and its primary winding termination end is connected to bus LP.

The anode of diode 61 is connected to the primary winding termination end of transformer 51 through the cathode and anode of diode 21, and is also connected to the cathode of GTO 11 through snubber capacitor 31. The anode of GTO 11 is connected to the primary winding termination end of transformer 51. The cathode and anode of GTO 11 are respectively connected to the anode and cathode of flywheel diode 91.

The anode of diode 62 is connected to the primary winding termination end of transformer 51 through the cathode and anode of diode 22, and is also connected to the cathode of GTO 12 through snubber capacitor 32. The anode of GTO 12 is connected to the primary winding termination end of transformer 51. The cathode and anode of GTO 12 are respectively connected to the anode and cathode of flywheel diode 92.

Similarly, the anode of diode 63 is connected to the primary winding termination end of transformer 51 through the cathode and anode of diode 23, and is also connected to the cathode of GTO 13 through snubber capacitor 33. The anode of GTO 13 is connected to the primary winding termination end of transformer 51. The cathode and anode of GTO 13 are respectively connected to the anode and cathode of flywheel diode 93.

The first arm of the inverter shown in FIG. 1, including the snubber energy regenerating circuit of the present invention, is arranged as described above.

Negative DC power supply bus LN is connected to the secondary winding termination end of voltage transformer 52. The secondary winding start end (indicated by a black dot) of transformer 52 is connected to positive bus LP through the anode and cathode of diode 42. The primary winding termination end of transformer 52 is connected to the anode of each of diodes 64 to 66, and the primary winding termination end thereof (indicated by a black dot) is connected to bus LN.

The cathode of diode 64 is connected to the primary winding start end of transformer 52 through the anode and cathode of diode 24, and is also connected to the anode of GTO 14 through snubber capacitor 34. The cathode of GTO 14 is connected to the primary winding start end of transformer 52. The cathode and anode of GTO 14 are respectively connected to the anode and cathode of flywheel diode 94.

The cathode of diode 65 is connected to the primary winding start end of transformer 52 through the anode and cathode of diode 25, and is also connected to the anode of GTO 15 through snubber capacitor 35. The cathode of GTO 15 is connected to the primary winding start end of transformer 52. The cathode and anode of GTO 15 are respectively connected to the anode and cathode of flywheel diode 95.

Similarly, the cathode of diode 66 is connected to the primary winding start end of transformer 52 through the anode and cathode of diode 26, and is also connected to the anode of GTO 16 through snubber capacitor 36. The cathode of GTO 16 is connected to the primary winding start end of transformer 52. The cathode and anode of GTO 16 are respectively connected to the anode and cathode of flywheel diode 96.

The second arm of the inverter shown in FIG. 1, including the snubber energy regenerating circuit of the present invention, is arranged as described above.

A three-phase load (not shown) is connected to nodes N1 to N3 of the respective arms of the inverter.

In the snubber energy regenerating circuit with the above arrangement, when GTO 11 is turned on, a charge on snubber capacitor 31 is discharged through diode 61, the primary winding of transformer 51, and GTO 11. Upon the discharging, snubber energy applied to the primary winding of transformer 51 is transferred to DC input capacitor 7 through the secondary winding of transformer 51 and diode 41. Thus, snubber energy is regenerated onto DC buses LP and LN connected to capacitor 7.

In the arrangement shown in FIG. 1, the number of transformer (51) necessary for three switching elements (11 to 13) in one arm (e.g., first arm) is 1. In contrast to this, if three conventional arrangements shown in FIG. 2 are merely gathered, three transformers are required. More specifically, according to the embodiment of FIG. 1, when regeneration of snubber energy is performed from N switching elements in one arm, the number of necessary transformers can be reduced to 1/N that of the conventional arrangement.

Figure 5:
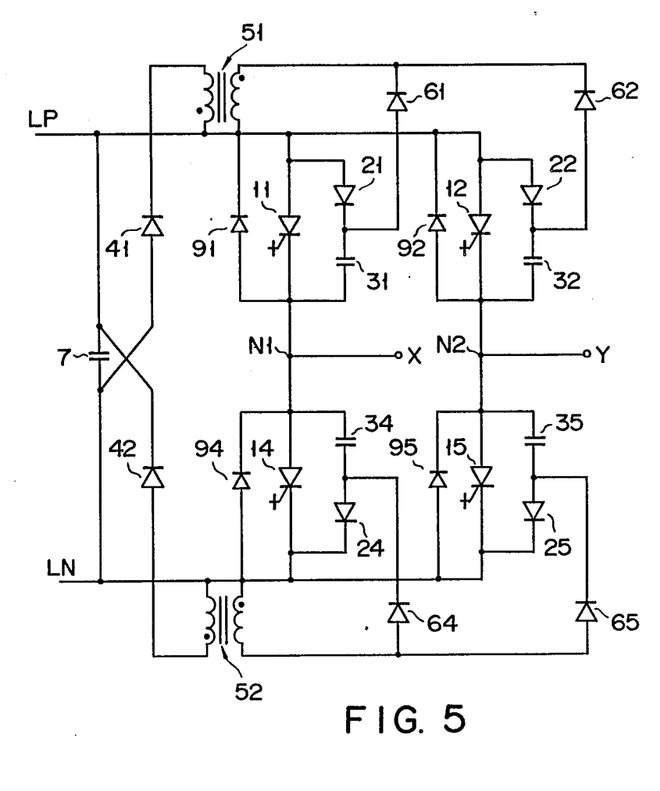
FIG. 5 is a circuit diagram showing a case wherein the circuit arrangement shown in FIG. 1 is modified for a two-phase AC circuit.

FIG. 5 shows a case wherein the circuit arrangement shown in FIG. 1 is modified to a single-phase AC circuit.

According to the embodiment shown in FIG. 5, snubber energy can be regenerated by transformers (51, 52) half in number those of a case wherein two sets of the arrangements shown in FIG. 2 are used.

Figure 6:
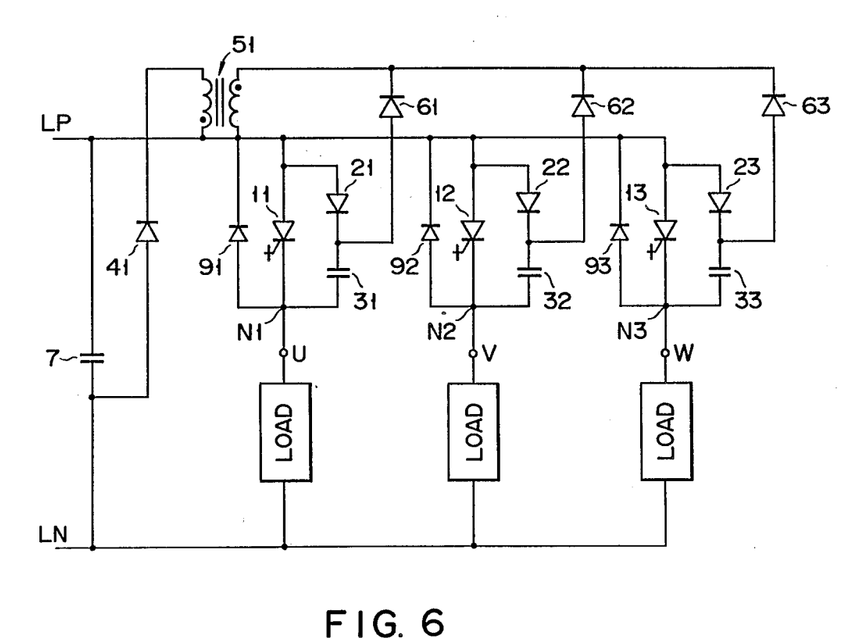
FIG. 6 is a circuit diagram showing a circuit equivalent to a part of the circuit arrangement shown in FIG. 1 (i.e., a negative arm in the lower half of FIG. 1 is omitted)

FIG. 6 shows a circuit wherein the second arm (the lower half arm in FIG. 1) is omitted from the circuit arrangement shown in FIG. 1. According to the embodiment shown in FIG. 6, snubber energy can be regenerated by a further smaller number of voltage transformer (51) than that of FIG. 1.

Figure 7:
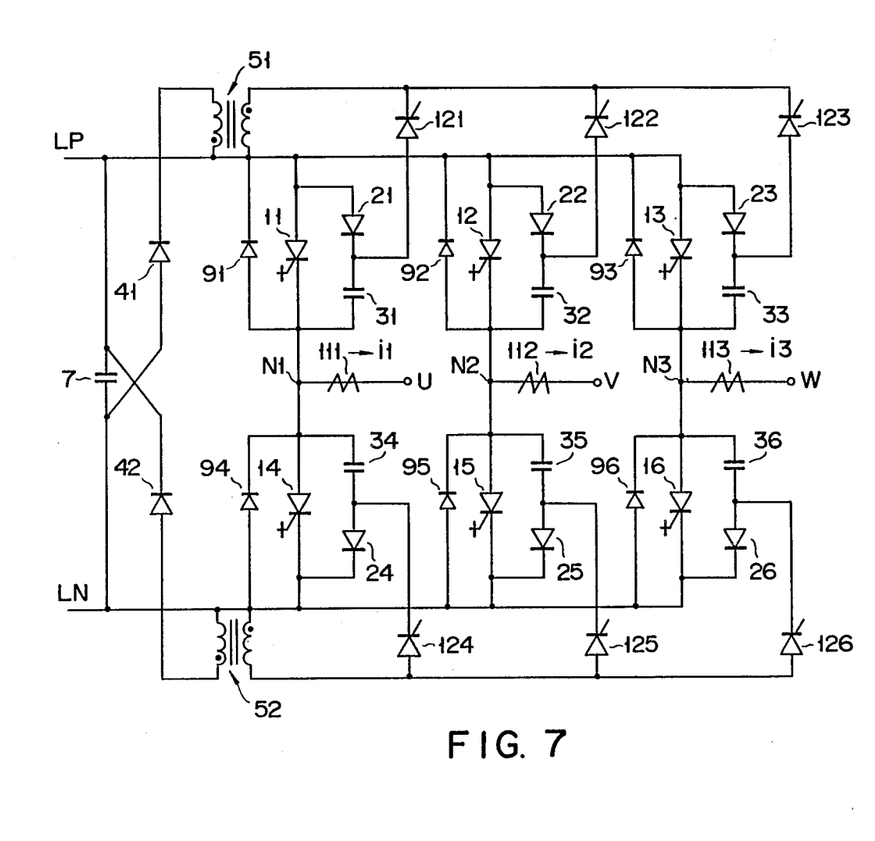
FIG. 7 is a circuit diagram showing a snubber energy regenerating circuit according to another embodiment of the present invention, in which thyristors (121-126) are used in place of diodes (61-66)

FIG. 7 shows an inverter including a snubber energy regenerating circuit according to another embodiment of the present invention. In this embodiment, the snubber energy regenerating circuit section employs thyristors 121 to 126 in place of diodes 61 to 66.

In the arrangement shown in FIG. 7, when thyristor 121 (or 122 or 123) of the first arm is turned on, thyristor 124 (or 125 or 126) of the second arm is turned off. When thyristor 124 (or 125 or 126) of the second arm is turned on, thyristor 121 (or 122 or 123) of the first arm is turned off. Thus, since positive and negative transformers 51 and 52 are operated with a 50% duty cycle for one phase (U, V, or W), a snubber discharge current of transformers 51 and 52 is reduced to half that in FIG. 1.

Therefore, according to the embodiment shown in FIG. 7, current capacities of transformers 51 and 52 can be reduced to half that in FIG. 1, and the entire apparatus can be rendered further compact.

FIGS. 8A–8E are timing charts for explaining the circuit operation of the embodiment of FIG. 7, with reference to one phase (U) of the three-phase (U, V, W) circuit.

Figures 8A, 8B:
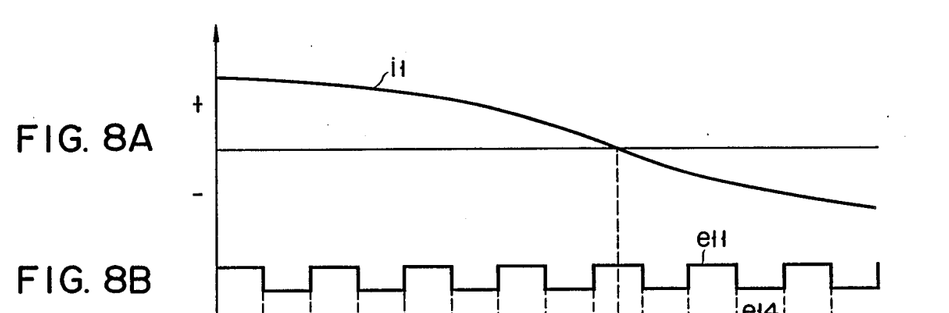
FIGS. 8A-8E are timing charts for explaining the circuit operation of the embodiment shown in FIG. 7.
Figures 8C, 8D:
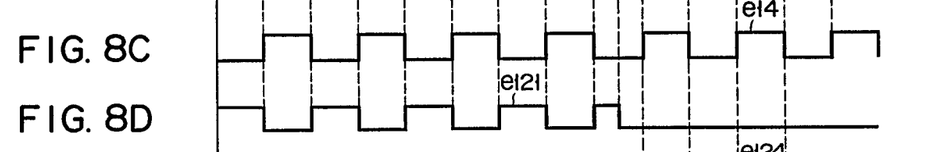
Figure 8E:
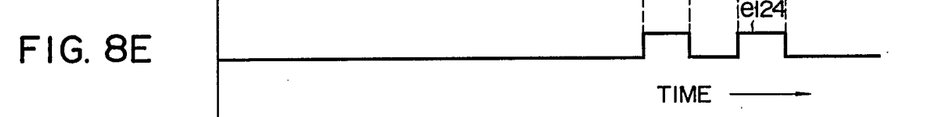

Signals e121 and e124 shown in FIGS. 8D and 8E can be obtained as follows. The output from current transformer 111 is waveshaped to generate a gate signal which goes to H level when U-phase load current i1 (FIG. 8A) is positive and goes to L level when current i1 is negative, and the gate signal is phase-inverted to obtain an inverted gate signal thereof. The gate signal and ON signal e11 (FIG. 8B) for GTO 11 are logically ANDed to obtain ON signal e121 (FIG. 8D) for thyristor 121. The inverted gate signal and ON signal e14 (FIG. 8C) for GTO 14 are logically ANDed to obtain ON signal e124 (FIG. 8E) for thyristor 124.

The operation timings of the V- and W-phase circuits of the embodiment shown in FIG. 7 are the same as that of the U phase, except that their timing phases are delayed by 120 degrees and 240 degrees, respectively, from the U phase.

Figure 9:
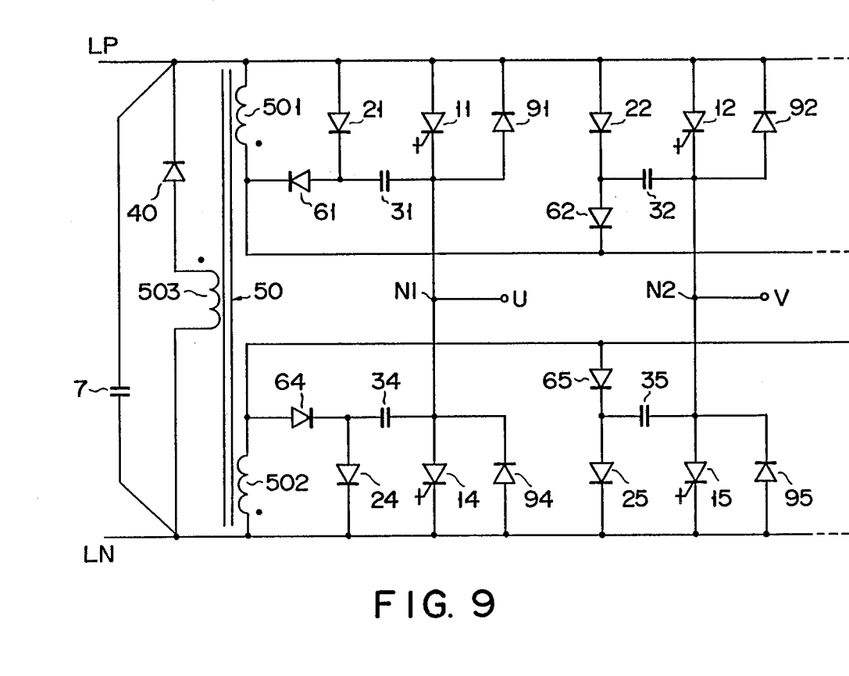
FIG. 9 is a circuit diagram of an inverter including a snubber energy regenerating circuit according to still another embodiment of the present invention, in which upper and lower arms commonly use a single transformer of the snubber energy regenerating circuit.

FIG. 9 shows a snubber energy regenerating circuit according to still another embodiment of the present invention, in which two, i.e., positive and second arms commonly use a voltage transformer of the energy regenerating circuit.

More specifically, first primary winding 501 of transformer 50 is connected to GTOs 11, 12, ... of the first arm through diodes 61, 62, ..., and second primary winding 502 thereof is connected to GTOs 14, 15, ..., of the second arm through diodes 64, 65, ... Snubber energy of the first arm applied to primary winding 501 and snubber energy of the second arm applied to primary winding 502 are magnetically combined in the magnetic circuit of transformer 50. The combined snubber energy is derived from secondary winding 503 of transformer 50, and is regenerated to capacitor 7 through diode 40.

In the embodiment of FIG. 9, two separate transformers (51, 52) in FIG. 1 are combined into one. For this reason, although the physical size of transformer 50 of FIG. 9 becomes larger than each transformer (51, 52) of FIG. 1, but it can be smaller than the total size of transformers 51 and 52 in FIG. 1.

Since the secondary circuit of transformer 50 in FIG. 9 is constituted by only one winding 503 and one diode 40, the circuit arrangement can be simplified as compared to the embodiment of FIG. 1 wherein two secondary winding circuits and two diodes 41 and 42 are used.

Figure 10:
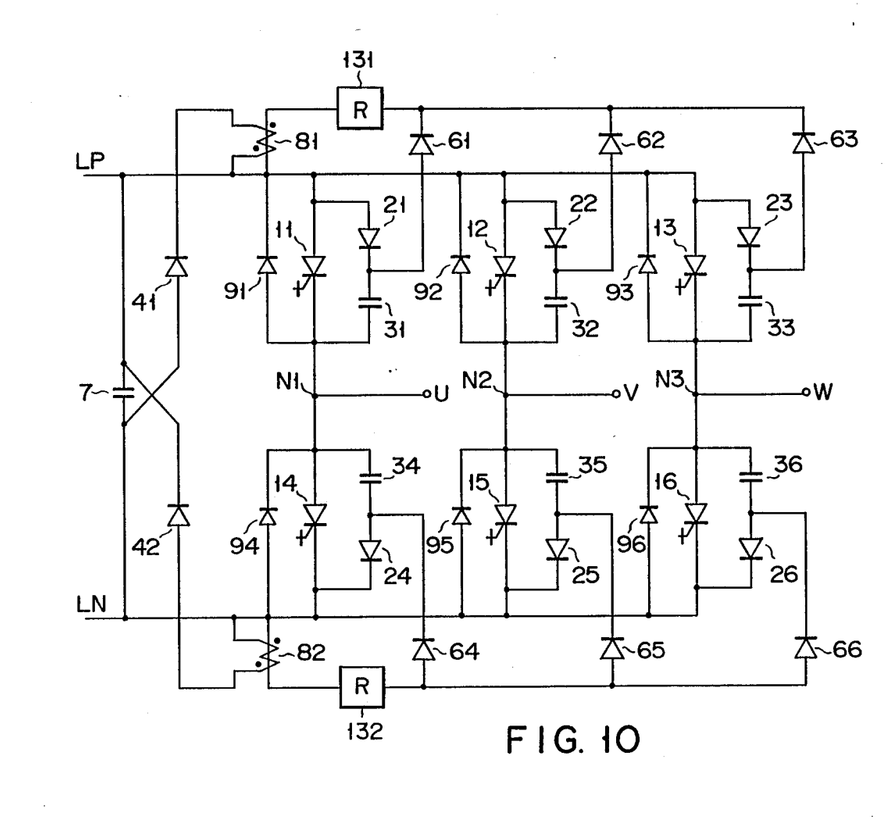
FIG. 10 is a circuit diagram showing an inverter including a snubber energy regenerating circuit according to yet another embodiment of the present invention, in which a current transformer is employed as a transformer of the snubber energy regenerating circuit.

FIG. 10 shows a snubber energy regenerating circuit according to yet another embodiment of the present invention. In this embodiment, current transformers 81 and 82 are employed in place of voltage transformers 51 and 52. Resistors 131 and 132 are respectively inserted in current input circuits for transformers 81 and 82.

Resistors 131 and 132 of this embodiment are provided to suppress snubber discharge currents applied to current transformers 81 and 82. Resistors 131 and 132 may be reactors. When the snubber discharge currents do not exceed allowable current values of transformers 81 and 82, these resistors (or reactors) can be omitted.

In each embodiment of the present invention, diodes 40 to 42 and 61 to 66 have a function of unidirectionally conducting the regenerated snubber energy from snubber capacitors 31 to 36 to DC input capacitor 7.

The present invention is not limited to the aforementioned embodiments. Various modifications and additions of other elements can be made within the scope of the invention defined in the appended claims (i.e., transformers or the like of the snubber energy regenerating circuit are commonly used for a plurality of switching element circuits). For example, although GTOs 11 to 16 in FIG. 1, etc, constitute a DC/AC inverter, the present invention can be applied to other power converters such as a rectifier, a cycloconverter, and the like.

What is claimed is:

1. A snubber energy regenerating circuit for an inverter comprising one or more switching element arms each including a plurality of switching elements, comprising:

a plurality of snubber capacitor circuits respectively connected to said plurality of switching elements, each snubber capacitor circuit being charged by a voltage applied to a switching element when said switching element connected thereto is kept off; and regenerating means, commonly connected to two or more of said plurality of snubber capacitor circuits, for, when said switching elements connected to said snubber capacitor circuits are turned on, discharging charges accumulated in said snubber capacitor circuits so that the discharged energy is regenerated to power supply circuits of the inverter.

2. A circuit according to claim 1, wherein said regenerating means includes:

transformer means, connected to said two or more snubber capacitor circuits and said power supply circuits of the inverter, for converting the discharged energy from said two or more snubber capacitor circuits to electric energy corresponding to a voltage value of said power supply circuits.

3. A circuit according to claim 2, wherein said regenerating means further includes:

diode rectifier means, connected to said two or more snubber capacitor circuits and said transformer means, for causing the discharged energy to flow unidirectionally from said two or more snubber capacitor circuits to said transformer means.

4. A circuit according to claim 1, wherein said switching element arms include a first arm connected to a positive one of said power supply circuits, and a second arm connected to a negative one thereof;

said regenerating means is provided for each of said first and second arms;

the first arm regenerating means includes:

first transformer means, coupled to said two or more snubber capacitor circuits connected to the positive one of said power supply circuits, for converting the discharged energy from said two or more snubber capacitor circuits to electric energy corresponding to a voltage value of said power supply circuits; and the second arm regenerating means includes:

second transformer means, coupled to said two or more snubber capacitor circuits connected to the negative one of said power supply circuits, for converting the discharged energy from said two or more snubber capacitor circuits to electric energy corresponding to the voltage value of said power supply circuits.

5. A circuit according to claim 4, wherein said first arm regenerating means further includes:

first diode rectifier means for causing the discharged energy from said two or more snubber capacitor circuits to flow unidirectionally to said first transformer means.

6. A circuit according to claim 5, wherein said second arm regenerating means further includes:

second diode rectifier means for causing the discharged energy from said two or more snubber capacitor circuits to flow unidirectionally to said second transformer means.

7. A circuit according to claim 4, wherein said first arm regenerating means further includes:
first gate controlled rectifier means for causing the discharged energy from said two or more snubber capacitor means to flow intermittently to said first transformer means.

8. A circuit according to claim 7, wherein said second arm regenerating means further includes:
second gate controlled rectifier means for causing the discharged energy from said two or more snubber capacitor means to flow intermittently to said second transformer means, and wherein when discharging of energy is performed by said first gate controlled rectifier means, discharging of energy by said second gate controlled rectifier means is inhibited, and when the discharging of energy is performed by said second gate controlled rectifier means, the discharging of energy by said first gate controlled rectifier means is inhibited.

9. A circuit according to claim 1, wherein said switching element arms include a first arm connected to a positive one of said power supply circuits of the inverter, and a second arm connected to a negative one thereof,
said regenerating means is provided for each of said first and second arms, and
said regenerating means of said first and second arms commonly include:
transformer means for converting discharged energy from said two or more snubber capacitor circuits connected to the positive one of said power supply circuits to electric energy corresponding to a voltage value of said power supply circuits, and for converting discharged energy from said two or more snubber capacitor circuits connected to the negative one of said power supply circuits to electric energy corresponding to the voltage value of said power supply circuits.

10. A circuit according to claim 9, wherein the first arm regenerating means further includes:
first diode rectifier means for causing the discharged energy from said two or more snubber capacitor circuits to flow unidirectionally to said transformer means.

11. A circuit according to claim 10, wherein said second arm regenerating means further includes:
second diode rectifier means for causing the discharged energy from said two or more snubber capacitor circuits to flow unidirectionally to said transformer means.

12. A circuit according to claim 9, wherein said first arm regenerating means further includes:
first gate controlled rectifier means for causing the discharged energy from said two or more snubber capacitor means to flow intermittently to said transformer means.

13. A circuit according to claim 12, wherein said second arm regenerating means further includes:
second gate controlled rectifier means for causing the discharged energy from said two or more snubber capacitor means to flow intermittently to said transformer means, and wherein when discharging of energy is performed by said first gate controlled rectifier means, discharging of energy by said second gate controlled rectifier means is inhibited, and when discharging of energy is performed by said second gate controlled rectifier means, discharging of energy by said first gate controlled rectifier means is inhibited.

14. A power converter comprising:
an inverter comprising plural first thyristors connected to a positive bus and plural second thyristors series connected to respective of said plural first thyristors and to a negative bus;
first and second transformers; and
plural snubber circuits each being formed of series circuits of diodes and capacitors, which series circuits are connected in parallel with respective of said plural first and second thyristors;
plural first reverse-flow-preventing diodes, one end of each of which is connected to a series connection node of the diode and the capacitor of the snubber circuits connected to said positive bus of said inverter, and the other end of each of which is commonly connected to said positive bus through a primary winding of said first transformer; and
plural second reverse-flow-preventing diodes, one end of each of which is connected to a series connection node of the diode and the capacitor of the snubber circuits connected to said negative bus of said inverter, and the other end of each of which is commonly connected to said negative bus through a primary winding of said second transformer,
wherein secondary windings of said first and second transformers are coupled to said positive and negative buses connected to a power supply line of said inverter.

* * * * *